United States Patent
Yi et al.

(10) Patent No.: US 9,695,257 B2
(45) Date of Patent: Jul. 4, 2017

(54) OLEFIN POLYMERIZATION CATALYST AND PREPARATION AND APPLICATION THEREOF

(71) Applicant: PETROCHINA COMPANY LIMITED, Beijing (CN)

(72) Inventors: Jianjun Yi, Beijing (CN); Qigu Huang, Beijing (CN); Hongming Li, Beijing (CN); Mingge Zhang, Beijing (CN); Zhi Liu, Beijing (CN); Wei Liu, Beijing (CN); Yisen Wang, Beijing (CN); Weisong Cui, Beijing (CN)

(73) Assignee: Petrochina Company Limited, Beijing (CN)

( * ) Notice: Subject to any disclaimer, the term of this patent is extended or adjusted under 35 U.S.C. 154(b) by 0 days.

(21) Appl. No.: 14/764,451

(22) PCT Filed: Jul. 11, 2013

(86) PCT No.: PCT/CN2013/000835
§ 371 (c)(1),
(2) Date: Jul. 29, 2015

(87) PCT Pub. No.: WO2014/117307
PCT Pub. Date: Aug. 7, 2014

(65) Prior Publication Data
US 2015/0361189 A1    Dec. 17, 2015

(30) Foreign Application Priority Data

Jan. 30, 2013 (CN) .......................... 2013 1 0035301

(51) Int. Cl.
*C08F 10/02* (2006.01)
*C08F 110/02* (2006.01)

(52) U.S. Cl.
CPC ............ *C08F 10/02* (2013.01); *C08F 110/02* (2013.01)

(58) Field of Classification Search
CPC ...................................................... C08F 10/02
See application file for complete search history.

(56) References Cited

U.S. PATENT DOCUMENTS

2013/0072647 A1* 3/2013 Yi .............................. C08F 4/16
526/123.1

FOREIGN PATENT DOCUMENTS

| CN | 101565478 | A |  | 10/2009 |  |
|----|-----------|---|--|---------|--|
| CN | 101633703 | A |  | 1/2010 |  |
| CN | 101845104 | A |  | 9/2010 |  |
| CN | 101880341 | A |  | 11/2010 |  |
| CN | 102358761 | A |  | 2/2012 |  |
| CN | WO 2012142733 | A1 | * | 10/2012 | ............... C08F 4/16 |
| CN | 102766226 | A |  | 11/2012 |  |
| CN | 102775531 | A |  | 11/2012 |  |
| CN | 103145891 | A |  | 6/2013 |  |
| JP | 61211310 | A | * | 9/1986 |  |
| JP | H06-17404 | B2 | * | 3/1994 |  |

OTHER PUBLICATIONS

Abstract, JP 61-211310.*
Machine translation of Harada (JP H06-17404).*
Machine translation of Huang et al. (CN 102358761) (original provided by Applicant).*
First Office Action received in related CN Application No. 201310035301.3 on Aug. 4, 2014 and Engiish translation.
Search Report received in related CN Application No. 201310035301.3 dated Dec. 25, 2015 and English translation.
International Search Report and English Language translation of the International Search Report for PCT/CN2013/000835 mailed Oct. 31, 2013.

* cited by examiner

*Primary Examiner* — Catherine S Branch
(74) *Attorney, Agent, or Firm* — Meunier Carlin & Curfman LLC

(57) ABSTRACT

The present invention relates to preparation and application of an olefin polymerization catalyst. The main catalyst is composed of a carrier, a transition metal halide, and an organic alcohol compound. The transition metal halide is obtained by in-situ reaction between titanate and silicon halide. The molar ratio of the carrier to the transition metal halide to the organic alcohol compound is 1 to 0.01-20 to 0.1-6. The molar ratio of the titanate to the silicon halide is 1 to 0.5-2. The co-catalyst is an organo-aluminum compound. The molar ratio of the transition metal halide in the main catalyst to the co-catalyst is 1 to 30-500. Particles of the catalyst are good in morphology and are in a spherical shape. The catalyst has high activity and the polymer obtained by using the catalyst has a high molecular weight. The catalyst is applicable to a slurry method, a vapor phase polymerization process, or a combined polymerization process. The preparation method thereof is simple, has low requirements on devices, and produces little pollution on the environment.

12 Claims, No Drawings

OLEFIN POLYMERIZATION CATALYST AND PREPARATION AND APPLICATION THEREOF

TECHNICAL FIELD

The present invention belongs to the field of olefin polymerization catalyst and olefin polymerization, and particularly relates to a catalyst for polymerization of ethylene or copolymerization of ethylene, a production method for the catalyst and use of the catalyst.

BACKGROUND

The olefin polymerization catalyst is the core of polymerization technology of polyolefin. As seen from the progress of olefin polymerization catalyst, there are mainly two aspects: (1) development of a catalyst capable of producing polyolefin resin with a special performance or better performance, such as metallocene catalyst and non-metallocene late transition metal catalyst; (2) simplification of the catalyst production process, reduction of catalyst cost, and development of environment-friendly technology to improve benefit and enhance competitiveness, based on a further improvement of the performance of the catalyst, for the production of general polyolefin resin. Before the 1980s, the research of polyethylene catalyst was focused on the pursuit of catalyst efficiency. After nearly 30 years of efforts, the catalytic efficiency of the polyethylene catalyst has been improved, the polyolefin production process is simplified, and the energy consumption and material consumption are reduced.

Patents CN201010186264.2 and CN200910092169.3 disclose a supported catalyst consisting essentially of a carrier, a titanium halide and an electron donor, wherein the titanium halide is added directly into the catalyst components.

The present application has found that the polymerization or copolymerization of ethylene can be efficiently catalyzed by a catalyst system composed of a main catalyst, produced by loading titanium halide generated by in-situ reaction between titanate and silicon halide onto a carrier during the preparation of the catalyst, and a co-catalyst. The main catalyst prepared by the present invention has particles with good morphology, a high loading capacity, and a high activity, and the catalyst will not peel off from the carrier, and is applicable to a slurry method, a vapor phase polymerization process, or a combined polymerization process.

SUMMARY OF THE INVENTION

An object of the present invention is to provide a catalyst having a high catalytic activity for use in the polymerization of ethylene or copolymerization of ethylene with a comonomer, and the production method thereof.

The present invention provides an ethylene copolymerization catalyst composed of a main catalyst and a co-catalyst. The main catalyst is composed of a carrier, a transition metal halide, and an organic alcohol compound. The relation of the amounts of the carrier, the transition metal halide and the organic alcohol compound is that the molar ratio of the carrier to the transition metal halide to the organic alcohol compound is 1 to 0.01-20 to 0.1-6. The transition metal halide is obtained by in-situ reaction between titanate and silicon halide. The molar ratio of the titanate to the silicon halide is 1 to 0.5-2. The co-catalyst is an organo-aluminum compound. The relation of the amounts of the main catalyst and the co-catalyst is that the molar ratio of the transition metal halide in the main catalyst to the co-catalyst is 1 to 30-500.

The carrier is an inorganic oxide carrier, a halide carrier, or a polymeric carrier. Specifically, it may be selected from magnesium dihalide, complexes of magnesium dihalide with water or alcohol, derivatives of magnesium dihalides having one or both of halogen atoms substituted with hydroxy or halohydroxy group in the formulae, such as magnesium dichloride, magnesium dibromide, magnesium diiodide, methoxy magnesium chloride, ethoxy magnesium chloride, propoxy magnesium chloride, butoxy magnesium chloride, phenoxy magnesium chloride, magnesium ethoxide, magnesium isopropoxide, magnesium butoxide, isopropoxy magnesium chloride, dibutyl magnesium, butylmagnesium chloride and the like, and silica, alumina, polystyrene and the like. Among them, magnesium dichloride, dibutyl magnesium or butylmagnesium chloride is preferred.

One characteristic of the present invention is addition of titanate in the preparation of the main catalyst, wherein the titanate is selected from at least one of a compound having a general formula (1) Ti(OR)$_4$, wherein, R is selected from C$_1$-C$_{20}$ aliphatic hydrocarbon group, C$_6$-C$_{20}$ cyclopentadienyl group and derivatives thereof, C$_6$-C$_{20}$ aromatic hydrocarbon group, COR' or COOR', where R' is C$_1$-C$_{10}$ aliphatic group or C$_6$-C$_{10}$ aromatic group. R may be specifically selected from: at least one of methyl, ethyl, propyl, butyl, pentyl, hexyl, heptyl, octyl, nonyl, decyl, iso-butyl, tert-butyl, iso-pentyl, tert-pentyl, 2-ethylhexyl, phenyl, naphthyl, o-methylphenyl, m-methylphenyl, p-methylphenyl, o-sulfophenyl, formyl, acetyl or benzoyl and the like. The transition metal (such as Ti, Zr, Hf, Fe, Co, Ni and the like) halides may be specifically selected from one or more of titanium tetrabutoxide, titanium tetraethoxide, titanium tetraphenoxide, and titanium tetracyclohexyloxide. Among them, titanium tetrabutoxide is preferred. The molar ratio of the titanate to the carrier is preferably 0.1-20 to 1.

One characteristic of the present invention is addition of silicon halide in the preparation of the main catalyst, wherein the silicon halide is selected from at least one of a compound having a general formula (2) SiX$_n$R''$_m$, wherein, X is a halogen, preferably Cl, Br, F or the like; R'' is H, C$_1$-C$_{20}$ aliphatic hydrocarbon group, C$_1$-C$_{20}$ aliphatic alkoxy group, C$_6$-C$_{20}$ cyclopentadienyl and derivatives thereof, or C$_6$-C$_{20}$ aromatic hydrocarbon group. R'' may be specifically selected from: at least one of methyl, ethyl, propyl, butyl, pentyl, hexyl, heptyl, octyl, nonyl, decyl, iso-butyl, tert-butyl, iso-pentyl, tert-pentyl, 2-ethylhexyl, phenyl, naphthyl, o-methylphenyl, m-methylphenyl, p-methylphenyl, o-sulfophenyl, formyl, acetyl or benzoyl and the like. n is 1, 2, 3, or 4; m is 0, 1, 2 or 3; n+m=4. Among them, silicon tetrachloride is preferred. The molar ratio of the silicon halide to the carrier is preferably 0.1-20 to 1.

One characteristic of the present invention is addition of organic alcohol in the preparation of the main catalyst, wherein the organic alcohol is selected from at least one of a compound having a general formula (3) R$^3$OH, wherein, R$^3$ is C$_1$-C$_{20}$ aliphatic hydrocarbon group, C$_6$-C$_{20}$ cyclopentadienyl group and derivatives thereof, or C$_6$-C$_{20}$ aromatic hydrocarbon group. R$^3$ may be specifically selected from: at least one of methyl, ethyl, propyl, butyl, pentyl, hexyl, heptyl, octyl, nonyl, decyl, iso-butyl, tert-butyl, iso-pentyl, tert-pentyl, 2-ethylhexyl, benzyl, and the like. Specifically, ethanol, octanol, isooctanol, isopropanol, hexanol, and amyl alcohol are preferred. The molar ratio of the organic alcohol to the carrier is preferably 3-15 to 1.

The co-catalyst, organo-aluminum compound is selected from one or a mixture of two of a compound having a general formula $AlR^5{}_nX_{3-n}$, wherein, $R^5$ is hydrogen or a hydrocarbon group or an alkoxy group having 1 to 20 carbon atoms, X is halogen, and n is an integer of $0<n\leq3$. Specifically, it may be selected from: one or a mixture of two of trimethyl aluminum, triethyl aluminum, tripropyl aluminum, triisobutyl aluminum, tri-n-hexyl aluminum, tri-tert-butyl aluminum, trioctyl aluminum, diethyl aluminum chloride, ethyl aluminum dichloride, ethylaluminum sesquichloride and the like; and methyl aluminoxane, ethyl aluminoxane and the like. Among them, one or a mixture of two of triethyl aluminum or triisobutyl aluminum or methyl aluminoxane is preferred.

As a preferred embodiment of the present invention, the relation of the amounts of the main catalyst and the co-catalyst is that the molar ratio of the transition metal halide to the co-catalyst is 1 to 30-500.

The present invention provides a production method for the olefin polymerization catalyst, comprising the steps of:

1) dispersing the carrier in an organic solvent at 10-150° C., adding the organic alcohol, and maintaining for 1-6 hours until the carrier is completely dissolved;

2) adding the titanate to the solution obtained in step 1) and stirring for 1-5 hours at 10-150° C.;

3) adding the silicon halide to the solution obtained in step 2) at 10-150° C., after dropwise adding, continuing the reaction for 1-4 hours, stopping the reaction, standing for precipitation, filtering, and washing and drying the precipitate obtained;

4) dispersing the product obtained in step 3) in an organic solvent, adding excess $TiCl_4$ dropwise at a temperature of $-10°$ C. to 30° C., maintaining at the temperature of $-10°$ C. to 30° C. for 1 hour, slowly warming up to 60° C. to 100° C. and reacting for 2-5 hours, after the reaction, washing with toluene or n-hexane for 4-6 times, filtering, removing unreacted materials and the solvent, and drying by vacuum suction to give the main catalyst; and 5) mixing the main catalyst and the co-catalyst in a molar ratio of the co-catalyst to the transition metal halide in the main catalyst at 30-500 to 1, to obtain the olefin polymerization catalyst.

The organic solvent is selected from toluene, xylene, hexane, heptane, octane or decane, or a mixed solvent thereof, and toluene, hexane, heptane or decane is preferred.

Ethylene polymerization catalyst provided by the present invention may be used as the catalyst for polymerization of ethylene or copolymerization of ethylene with α-olefin, wherein the α-olefin is preferably propylene, 1-butene, 1-hexene, 1-octene, 1-decene, 3-methyl-1-butene, cyclopentene, 4-methyl-1-pentene, 1,3-butadiene, isoprene, styrene, methyl styrene or the like.

DETAILED DESCRIPTION

Example 1

1) Preparation of the main catalyst: Into a fully nitrogen-purged reactor, magnesium dichloride 1 g, ethanol 9 ml, and toluene 70 ml were sequentially added, heated with stirring to 100° C., and maintained for 3 h; after cooling to 60° C., 18.0 ml $Ti(OBu)_4$ was added dropwise; after reaction for 1 h, 11.0 ml $SiCl_4$ was slowly added dropwise at 10° C.; after reaction for 2 h, stirring was stopped, the resultant was left for precipitation and filtered, and the precipitate obtained was washed and dried to give solid particles. The resultant solid particles were dispersed in 30 ml of toluene, 20 ml $TiCl_4$ was added dropwise at 0° C., then maintained at 0-10° C. for 1 h, and reacted at 60° C. for 3 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, 1-octene 35 mL was added, after heated to 80° C., the autoclave was charged with hydrogen gas to 0.28 MPa, then with ethylene to 0.73 MPa, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with ethylene to 0.3 MPa, and the reaction was carried out at constant pressure and temperature for 2 h.

Example 2

1) Preparation of the main catalyst: Into a fully nitrogen-purged reactor, magnesium dichloride 1 g, isooctanol 10 ml, and toluene 60 ml were sequentially added, heated with stirring to 90° C., and maintained for 4 h; after cooling to 70° C., 22.0 ml $Ti(OBu)_4$ was added dropwise; after reaction for 1 h, 14.0 ml $SiCl_4$ was slowly added dropwise at 50° C.; after reaction for 3 h, stirring was stopped, the resultant was left for precipitation and filtered, and the precipitate obtained was washed and dried to give solid particles. The resultant solid particles were dispersed in 40 ml of toluene, 25 ml $TiCl_4$ was added dropwise at $-5°$ C., then maintained at 0-10° C. for 2 h, and reacted at 70° C. for 4 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.5 ml (2 mmol/ml) were sequentially added, 1-hexene 40 mL was added, after heated to 80° C., the autoclave was charged with hydrogen gas to 0.28 MPa, then with ethylene to 0.73 MPa, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.5 ml (2 mmol/ml) were sequentially added, after heated to 80° C., the autoclave was charged with ethylene to 0.3 MPa, and the reaction was carried out at constant pressure and temperature for 2 h.

Example 3

1) Preparation of the main catalyst: Into a fully nitrogen-purged reactor, magnesium dichloride 2 g, ethanol 15 ml, and toluene 90 ml were sequentially added, heated with stirring to 120° C., and maintained for 3 h; after cooling to 100° C., 35.0 ml $Ti(OBu)_4$ was added dropwise; after reaction for 1 h, 22.0 ml $SiCl_4$ was slowly added dropwise at 70° C.; after reaction for 2 h, stirring was stopped, the resultant was left for precipitation and filtered, and the precipitate obtained was washed and dried to give solid particles. The resultant solid particles were dispersed in 50 ml of toluene, 30 ml $TiCl_4$ was added dropwise at 0° C., then maintained at 0-10° C. for 1 h, and reacted at 65° C. for 3 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, 4-methyl-1-pentene 30 mL was added, after heated to 80° C., the autoclave was charged with hydrogen gas to 0.28 MPa, then with ethylene to 0.73 MPa, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with ethylene to 0.3 MPa, and the reaction was carried out at constant pressure and temperature for 2 h.

Example 4

1) Preparation of the main catalyst: Into a fully nitrogen-purged reactor, magnesium dichloride 1 g, ethanol 9 ml, and toluene 70 ml were sequentially added, heated with stirring to 100° C., and maintained for 4 h; after cooling to 90° C., 15.0 ml $Ti(OBu)_3Cl$ was added dropwise; after reaction for 1 h, 9.0 ml $SiCl_4$ was slowly added dropwise at 20° C.; after reaction for 2 h, stirring was stopped, the resultant was left for precipitation and filtered, and the precipitate obtained was washed and dried to give solid particles. The resultant solid particles were dispersed in 30 ml of toluene, 20 ml $TiCl_4$ was added dropwise at 0° C., then maintained at 0-10° C. for 1 h, and reacted at 60° C. for 3 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, 1-hexene 30 mL was added, after heated to 80° C., the autoclave was charged with hydrogen gas to 0.28 MPa, then with ethylene to 0.73 MPa, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with ethylene to 0.3 MPa, and the reaction was carried out at constant pressure and temperature for 2 h.

Example 5

1) Preparation of the main catalyst: Into a fully nitrogen-purged reactor, magnesium dichloride 1 g, isopropanol 13 ml, and toluene 70 ml were sequentially added, heated with stirring to 90° C., and maintained for 3 h; after cooling to 80° C., 15.0 ml $Ti(OEt)_4$ was added dropwise; after reaction for 1 h, 11.0 ml $SiCl_4$ was slowly added dropwise at 30° C.; after reaction for 2 h, stirring was stopped, the resultant was left for precipitation and filtered, and the precipitate obtained was washed and dried to give solid particles. The resultant solid particles were dispersed in 30 ml of toluene, 20 ml $TiCl_4$ was added dropwise at 0° C., then maintained at 0-10° C. for 1 h, and reacted at 60° C. for 3 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.5 ml (2 mmol/ml) were sequentially added, 1-hexene 30 mL was added, after heated to 80° C., the autoclave was charged with hydrogen gas to 0.28 MPa, then with ethylene to 0.73 MPa, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with ethylene to 0.3 MPa, and the reaction was carried out at constant pressure and temperature for 2 h.

Example 6

1) Preparation of the main catalyst: Into a fully nitrogen-purged reactor, magnesium dichloride 1 g, isooctanol 9 ml, and toluene 70 ml were sequentially added, heated with stirring to 100° C., and maintained for 3 h; after cooling to 80° C., 30.0 ml $Ti(OPr)_4$ was added dropwise; after reaction for 1 h, 11.0 ml $SiCl_4$ was slowly added dropwise at 10° C.; after reaction for 2 h, stirring was stopped, the resultant was left for precipitation and filtered, and the precipitate obtained was washed and dried to give solid particles. The resultant solid particles were dispersed in 30 ml of toluene, 20 ml $TiCl_4$ was added dropwise at 0° C., then maintained at 0-10° C. for 1 h, and reacted at 60° C. for 3 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.5 ml (2 mmol/ml) were sequentially added, 1-hexene 30 mL was added, after heated to 80° C., the autoclave was charged with hydrogen gas to 0.28 MPa, then with ethylene to 0.73 MPa, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with ethylene to 0.3 MPa, and the reaction was carried out at constant pressure and temperature for 2 h.

Comparative Example 1

1) Preparation of the main catalyst: Into a fully nitrogen-purged reactor, magnesium dichloride 3 g, ethanol 3.2 ml, epichlorohydrin 3 ml, tributyl phosphate 6.5 ml, and toluene 75 ml were sequentially added, heated with stirring to 60° C.; after the solid was completely dissolved to form a homogeneous solution, the temperature was maintained for 1 h; after cooling to −25° C., 50.0 ml $TiCl_4$ was added dropwise; hexane 10 ml was added dropwise, and after dropwise adding, tetraethoxy silane 4 ml was added; after reaction for 1 h, the temperature was sequentially maintained at −10° C. for 1 h, at 0° C. for 1 h, at 20° C. for 1 h, and raised to 60° C.; hexane 10 ml was added, and the reaction was carried out at constant temperature for 2 h. Stirring was stopped, and the suspension was allowed to stand, layered, had the supernatant removed by suction, washed with toluene twice, and hexane twice, dried with nitrogen flow, to give the main catalyst having a good flowability, and a narrow particle size distribution.

2) Ethylene copolymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with hydrogen gas to 0.28 MPa, then with ethylene to 0.73 MPa, 1-hexene 30 mL was added, and the reaction was carried out at constant pressure and temperature for 2 h.

3) Ethylene polymerization: A 0.5 liter stainless steel autoclave was sufficiently purged with nitrogen gas, and then the main catalyst 20 mg, dehydrated hexane 200 ml, and $AlEt_3$ Solution 1.2 ml (2 mmol/ml) were sequentially added, after heated to 80° C., the autoclave was charged with ethylene to 0.3 MPa, and the reaction was carried out at constant pressure and temperature for 2 h.

INDUSTRIAL APPLICABILITY

Particles of the ethylene copolymerization catalyst provided by the present invention are good in morphology and are in a spherical shape. The catalyst has high activity. It is applicable to a slurry method, a vapor phase polymerization process, or a combined polymerization process. The preparation method thereof is simple, has low requirements on devices, and produces little pollution on the environment.

The results of the Examples are shown in Table 1.

The invention claimed is:

1. An olefin polymerization catalyst comprising a main catalyst and a co-catalyst, wherein the main catalyst is derived from a reaction comprising a carrier, a transition metal halide, and an organic alcohol compound, and wherein the transition metal halide is generated by a reaction between a titanate and a silicon halide in the preparation of the main catalyst, wherein the carrier comprises a magnesium dihalide;
wherein the molar ratio of the titanate to the silicon halide is 1 to 0.5-2; and
wherein the main catalyst is prepared by:
a) dispersing the carrier in an organic solvent at 10-150° C. followed by adding the organic alcohol compound and dissolving the carrier for 1-6 hours to form a solution;
b) adding the titanate to the solution obtained in step a) and stirring for 1-5 hours at 10-150° C. to form a mixture;
c) adding the silicon halide to the mixture obtained in step b) at 10-150° C., reacting for 1-4 hours, stopping the reaction and allowing a precipitate to form, and filtering, washing, and drying the precipitate; and
d) dispersing the precipitate obtained in step c) in an organic solvent, adding excess $TiCl_4$ at a temperature of −10° C. to 30° C., maintaining at the temperature of −10° C. to 30° C. for 1-2 hours, warming up the organic solvent including the dispersed precipitate to 60° C. to 100° C. and reacting for 2-5 hours, and washing, filtering, and drying to produce the main catalyst.

2. The olefin polymerization catalyst according to claim 1, wherein the molar ratio of the carrier to the transition metal halide to the organic alcohol compound is 1 to 0.01-20 to 3-15.

3. The olefin polymerization catalyst according to claim 1, wherein the co-catalyst is an organo-aluminum compound.

4. The olefin polymerization catalyst according to claim 1, wherein the molar ratio of the transition metal halide in the main catalyst to the co-catalyst is 1 to 30-500.

5. The olefin polymerization catalyst according to claim 1, wherein the molar ratio of the carrier to the titanate to the silicon halide is 1 to 0.01-20 to 0.01-25.

6. The olefin polymerization catalyst according to claim 1, wherein the co-catalyst is an organo-aluminum compound selected from one or a mixture of two compounds having a

TABLE 1

| Example | Content of transition metal in the main catalyst (wt %) | Catalytic efficiency (KgPE/g cat) | Bulk density (g/cm³) | Comonomer | Molar content of comonomer in the polymer (mol %) |
|---|---|---|---|---|---|
| 1 | Ti, 5.1 | 43.4 | 0.30 | 1-octene | 0.3 |
|   |         | 41.4 | 0.30 | Ethylene homopolymerization | |
| 2 | Ti, 5.3 | 45.3 | 0.31 | 1-hexene | 1.9 |
|   |         | 42.3 | 0.31 | Ethylene homopolymerization | |
| 3 | Ti, 5.0 | 42.9 | 0.31 | 4-methyl-1-pentene | 1.2 |
|   |         | 44.9 | 0.31 | Ethylene homopolymerization | |
| 4 | Ti, 4.9 | 48.6 | 0.30 | 1-hexene | 3.8 |
|   |         | 50.5 | 0.31 | Ethylene homopolymerization | |
| 5 | Ti, 4.5 | 48.8 | 0.30 | 1-hexene | 2.1 |
|   |         | 49.1 | 0.31 | Ethylene homopolymerization | |
| 6 | Ti, 4.8 | 46.7 | 0.30 | 1-hexene | 1.8 |
|   |         | 48.4 | 0.31 | Ethylene homopolymerization | |
| Comparative Example 1 | Ti, 5.1 | 50.2 | 0.32 | 1-hexene | 1.6 |
|   |         | 50.1 | 0.32 | Ethylene homopolymerization | | general formula $AlR^5{}_nX_{3-n}$, wherein $R^5$ is hydrogen, a $C_1$-$C_{20}$ hydrocarbon group, or a $C_1$-$C_{20}$ alkoxy group, X is a halogen, and n is an integer of $0 < n \leq 3$.

7. The olefin polymerization catalyst according to claim 1, wherein the titanate is selected from at least one of a compound having a general formula $Ti(OR)_4$, wherein R is selected from $C_1$-$C_{20}$ aliphatic hydrocarbon group, $C_6$-$C_{20}$ cyclopentadienyl group and derivatives thereof, $C_6$-$C_{20}$ aromatic hydrocarbon group, COR' or COOR', where R' is $C_1$-$C_{10}$ aliphatic group or $C_6$-$C_{10}$ aromatic group.

8. The olefin polymerization catalyst according to claim 1, wherein the silicon halide is selected from at least one of a compound having a general formula $SiX_nR''_m$, wherein X is a halogen, R" is H, $C_1$-$C_{20}$ aliphatic hydrocarbon group, $C_1$-$C_{20}$ aliphatic alkoxy group, $C_6$-$C_{20}$ cyclopentadienyl and derivatives thereof, or $C_6$-$C_{20}$ aromatic hydrocarbon group, n is 1, 2, 3, or 4, m is 0, 1, 2 or 3, and wherein n+m=4.

9. The olefin polymerization catalyst according to claim 1, wherein the organic alcohol is selected from at least one of a compound having a general formula $R^3OH$, wherein $R^3$ is a $C_1$-$C_{20}$ aliphatic hydrocarbon group, a $C_6$-$C_{20}$ cyclopentadienyl group or a derivative thereof, or a $C_6$-$C_{20}$ aromatic hydrocarbon group.

10. A production method for the olefin polymerization catalyst according to claim 1, comprising the steps of:
    1) dispersing the carrier in an organic solvent at 10-150° C., adding the organic alcohol compound, and dissolving the carrier for 1-6 hours to form a solution;
    2) adding the titanate to the solution obtained in step 1) and stirring for 1-5 hours at 10-150° C. to form a mixture;
    3) adding the silicon halide to the mixture obtained in step 2) at 10-150° C., reacting for 1-4 hours, stopping the reaction and allowing a precipitate to form, and filtering, washing, and drying the precipitate obtained; wherein the molar ratio of the titanate to the silicon halide is 1 to 0.5-2;
    4) dispersing the precipitate obtained in step 3) in an organic solvent, adding excess $TiCl_4$ at a temperature of $-10°$ C. to 30° C., maintaining at the temperature of $-10°$ C. to 30° C. for 1-2 hours, slowly warming up the organic solvent including the dispersed precipitate to 60° C. to 100° C. and reacting for 2-5 hours, and washing, filtering, and drying to produce the main catalyst; and
    5) mixing the main catalyst and the co-catalyst in a molar ratio of the transition metal halide to the co-catalyst at 1 to 30-500 to obtain the olefin polymerization catalyst.

11. The production method according to claim 10, wherein the organic solvent is selected from toluene, xylene, hexane, heptane, octane, decane, and mixed solvents thereof.

12. A method for the polymerization of ethylene or copolymerization of ethylene with an α-olefin comprising the step of contacting the ethylene or the ethylene and α-olefin with the olefin polymerization catalyst according to claim 1 to form a polymer or copolymer.

* * * * *